United States Patent
Song et al.

(10) Patent No.: US 9,787,193 B2
(45) Date of Patent: Oct. 10, 2017

(54) SWITCHING POWER SUPPLY AND METHOD FOR CONTROLLING VOLTAGE OF BULK CAPACITOR IN THE SWITCHING POWER SUPPLY

(71) Applicant: DELTA ELECTRONICS, INC., Taoyuan Hsien, Taiwan (CN)

(72) Inventors: Haibin Song, Taiwan (CN); Daofei Xu, Taiwan (CN)

(73) Assignee: DELTA ELECTRONICS, INC., Taiwan (CN)

( * ) Notice: Subject to any disclaimer, the term of this patent is extended or adjusted under 35 U.S.C. 154(b) by 0 days.

(21) Appl. No.: 14/842,849

(22) Filed: Sep. 2, 2015

(65) Prior Publication Data

US 2016/0181931 A1    Jun. 23, 2016

(30) Foreign Application Priority Data

Dec. 18, 2014 (CN) .......................... 2014 1 0794862

(51) Int. Cl.
*H02M 1/15* (2006.01)
*H02M 3/335* (2006.01)
(Continued)

(52) U.S. Cl.
CPC ......... *H02M 3/33507* (2013.01); *H02M 1/15* (2013.01); *H02M 3/335* (2013.01); *H02M 7/06* (2013.01); *H02M 2001/007* (2013.01)

(58) Field of Classification Search
CPC ..... H02M 1/15; H02M 2001/007; H02M 7/06
(Continued)

(56) References Cited

U.S. PATENT DOCUMENTS 4,933,832 A * 6/1990 Schneider ............... H02M 1/10
    363/143
5,712,774 A    1/1998 Uramoto
(Continued)

FOREIGN PATENT DOCUMENTS

DE    2226197    * 12/1973
DE    2226197 A1    12/1973
(Continued)

OTHER PUBLICATIONS

EESR issued Jun. 3, 2016 by the EP Office.

*Primary Examiner* — Jeffrey Gblende
*Assistant Examiner* — David A. Singh
(74) *Attorney, Agent, or Firm* — Yunling Ren

(57) ABSTRACT

A switching power supply includes: a rectifying unit; a Bulk capacitor; a converter; a monitoring circuit; a control circuit, controlling discharging of the Bulk capacitor, being configured to perform controls such that the voltage across the Bulk capacitor maintains the peak value after the Bulk capacitor having been charged to a peak value of AC voltage, and to perform controls such that the Bulk capacitor discharges from a peak value when the instantaneous absolute value of the AC voltage is smaller than or equal to the preset voltage. A method for controlling a voltage of a Bulk capacitor in the switching power supply includes detecting an instantaneous absolute value of the AC voltage; comparing the detected instantaneous absolute value of the AC voltage with a preset voltage; and controlling discharging and charging state of the Bulk capacitor according to comparison results.

16 Claims, 9 Drawing Sheets

(51) Int. Cl.
*H02M 7/06* (2006.01)
*H02M 1/00* (2006.01)

(58) Field of Classification Search
USPC .................................................. 363/21.15
See application file for complete search history.

(56) References Cited

U.S. PATENT DOCUMENTS

| | | | | | |
|---|---|---|---|---|---|
| 5,737,204 | A | * | 4/1998 | Brown | H02J 9/062 |
| | | | | | 323/285 |
| 5,960,207 | A | * | 9/1999 | Brown | G06F 1/26 |
| | | | | | 363/98 |
| 6,069,801 | A | * | 5/2000 | Hodge, Jr. | H02M 1/4225 |
| | | | | | 363/21.02 |
| 6,388,397 | B1 | * | 5/2002 | Iwahori | H05B 41/282 |
| | | | | | 315/224 |
| 7,760,524 | B2 | * | 7/2010 | Matthews | H02M 3/33507 |
| | | | | | 363/45 |
| 2005/0030772 | A1 | * | 2/2005 | Phadke | H02M 1/4225 |
| | | | | | 363/71 |
| 2006/0171182 | A1 | * | 8/2006 | Siri | H02M 3/33592 |
| | | | | | 363/131 |
| 2009/0097286 | A1 | * | 4/2009 | Lin | H02M 1/4208 |
| | | | | | 363/65 |
| 2011/0025278 | A1 | * | 2/2011 | Balakrishnan | H02M 1/32 |
| | | | | | 320/166 |
| 2011/0149613 | A1 | * | 6/2011 | Lanni | H02M 1/4258 |
| | | | | | 363/21.12 |
| 2012/0120692 | A1 | * | 5/2012 | Choi | H02M 3/335 |
| | | | | | 363/78 |
| 2012/0314456 | A1 | * | 12/2012 | Lanni | H02M 1/4258 |
| | | | | | 363/21.02 |
| 2013/0188405 | A1 | * | 7/2013 | Jin | H02M 7/217 |
| | | | | | 363/49 |
| 2013/0242626 | A1 | * | 9/2013 | Li | H02M 1/36 |
| | | | | | 363/50 |
| 2013/0258722 | A1 | * | 10/2013 | Wang | H02M 1/4258 |
| | | | | | 363/21.12 |
| 2014/0268938 | A1 | | 9/2014 | Matthews et al. | |

FOREIGN PATENT DOCUMENTS

| | | | |
|---|---|---|---|
| JP | WO2011027816 | * | 3/2011 |
| WO | 2011027816 A1 | | 3/2011 |

* cited by examiner

SWITCHING POWER SUPPLY AND METHOD FOR CONTROLLING VOLTAGE OF BULK CAPACITOR IN THE SWITCHING POWER SUPPLY

This application is based upon and claims priority to Chinese Patent Application No. 201410794862.6, filed on Dec. 18, 2014, the entire contents of which are incorporated herein by reference.

TECHNICAL FIELD

The present disclosure relates to the technical field of switching power supplies.

BACKGROUND

In recent years, switching power supplies are developing to be miniaturized. Following such a development, switching power supplies are designed with higher switching frequency, and thus the volume of magnetic elements in the switching power supplies can be reduced. For Alternating Current (AC) input application, there is usually a Bulk capacitor to balance the instantaneous input and output powers under line frequency, and thus the Bulk capacitor cannot be miniaturized as the switching frequency increases. As a result, as the switching frequency increases, volume of the Bulk capacitor occupies a growing proportion in the volume of a switching power supply, which becomes a bottleneck of the miniaturization of switching power supplies.

SUMMARY

The present disclosure provides a switching power supply which includes: a rectifying unit having an Alternating Current (AC) side and a Direct Current (DC) side, the rectifying unit being configured to convert an AC voltage which is input to the AC side into a DC voltage which is output from the DC side; a Bulk capacitor connected to the DC side of the rectifying unit; a converter connected to the Bulk capacitor; a monitoring circuit connected to the AC side of the rectifying unit, the monitoring circuit being configured to detect and judge whether an instantaneous absolute value of the AC voltage is greater than a preset voltage; and a control circuit, controlling discharging of the Bulk capacitor, the control circuit being connected to the monitoring circuit and the Bulk capacitor, and being configured to perform controls such that the voltage across the Bulk capacitor maintains the peak value when the monitoring circuit judges that the instantaneous absolute value of the input AC voltage is greater than the preset voltage after the Bulk capacitor having been charged by the rectifying unit to a peak value of the AC voltage, and to perform controls such that the Bulk capacitor discharges from the maintained peak value of the AC voltage so as to provide power to the converter when the monitoring circuit judges that the instantaneous absolute value of the input AC voltage is smaller than or equal to the preset voltage.

The present disclosure further provides a method for controlling a voltage of a Bulk capacitor in a switching power supply, wherein the switching power supply includes a rectifying unit, a Bulk capacitor and a converter, the rectifying unit converts an input Alternating Current (AC) voltage into a Direct Current (DC) voltage, and the Bulk capacitor is disposed between the rectifying unit and the converter, wherein the method includes: detecting an instantaneous absolute value of the AC voltage; comparing the detected instantaneous absolute value of the AC voltage with a preset voltage; and controlling discharging and charging state of the Bulk capacitor according to comparison results.

DETAILED DESCRIPTION

Figure 1:
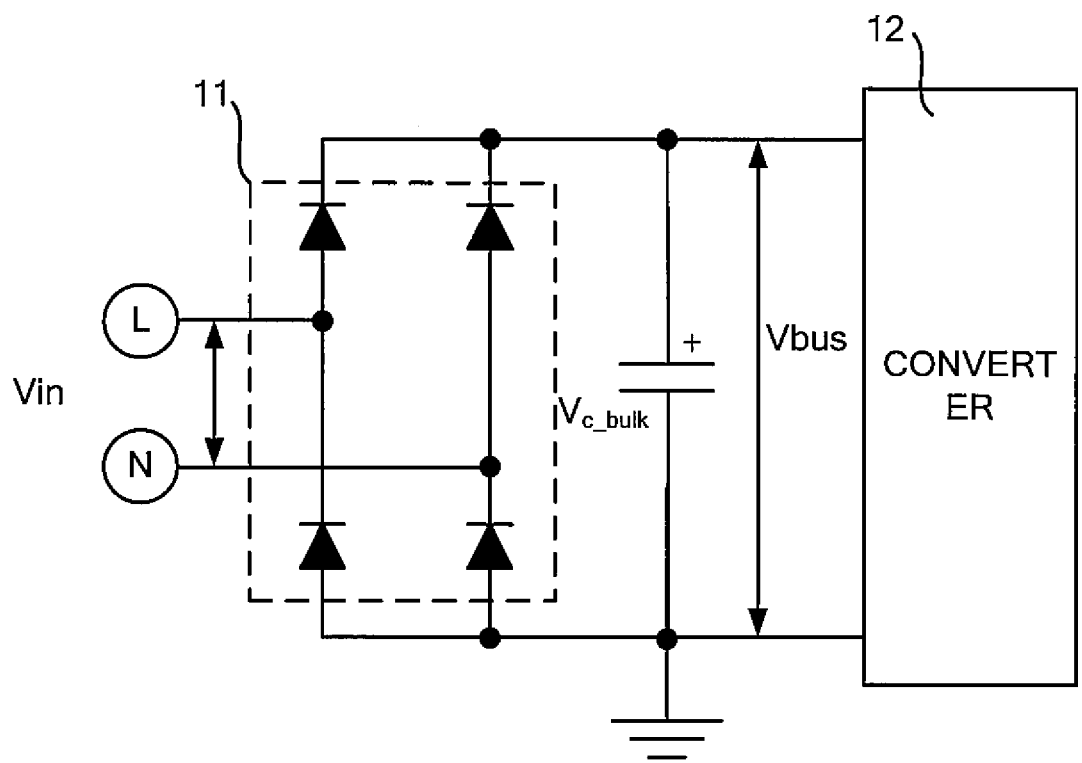
FIG. 1 illustratively shows a circuit block diagram of a conventional switching power supply.

FIG. 1 illustratively shows a circuit diagram of a conventional switching power supply. In the switching power supply, a Bulk capacitor C_bulk is connected in parallel with a rectifier bridge 11 and a converter 12 in a subsequent stage. The Bulk capacitor C_bulk may be charged by a voltage rectified by the rectifier bridge 11, and may in turn provide power to the converter 12 in a subsequent stage.

A Bulk capacitor in a switching power supply, as shown in FIG. 1, performs a function of balancing the instantaneous input and output powers under AC mains frequency, and thus the Bulk capacitor cannot be miniaturized as the switching frequency increases. As a result, as the switching frequency increases, the volume of a Bulk capacitor occupies a growing proportion in the volume of a switching power supply, which becomes a bottleneck of the miniaturization of switching power supplies.

Figure 2:
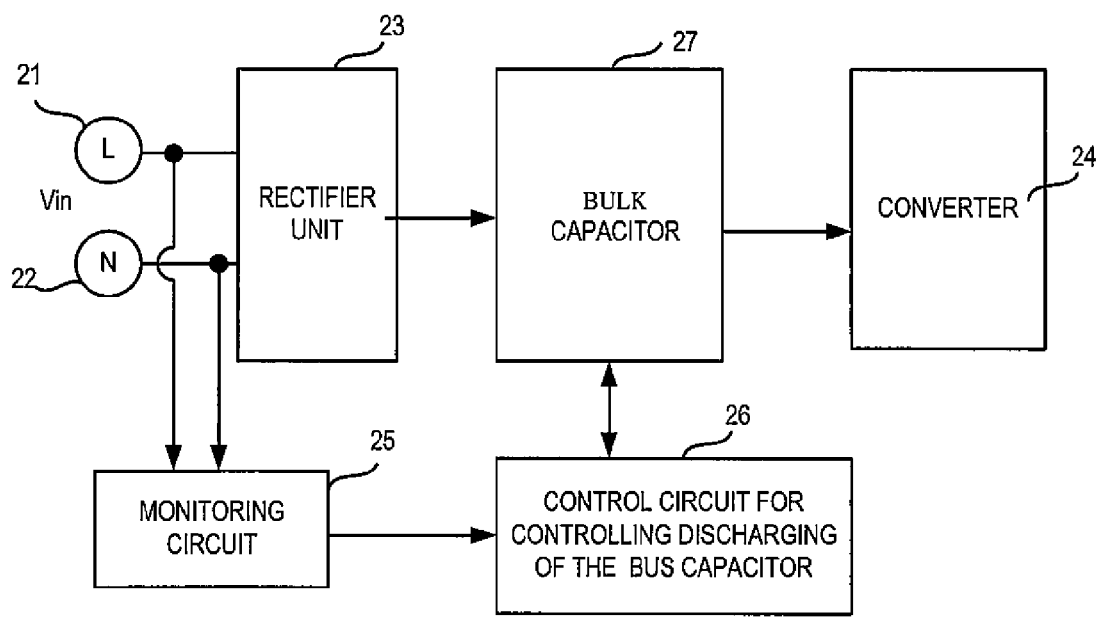
FIG. 2 illustratively shows a circuit block diagram of a switching power supply according to an embodiment of the present disclosure.

FIG. 2 illustratively shows a circuit block diagram of a switching power supply according to an embodiment of the present disclosure. The switching power supply includes a rectifying unit 23, a Bulk capacitor 27, a converter 24, a monitoring circuit 25 and a control circuit 26 for controlling discharging of the Bulk capacitor 27.

The rectifying unit 23 includes an AC side and a DC side and is configured to convert an AC voltage which is input to the AC side into a DC voltage which is output from the DC side. The AC side includes a first AC voltage input terminal 21 and a second AC voltage input terminal 22, both of which receive an input AC voltage Vin. For example, one of the first AC voltage input terminal 21 and the second AC voltage input terminal 22 may be connected to a zero line (N), and the other one may be connected to a live line (L). The rectifying unit 23 may be rectifying elements such as a rectifier bridge.

The Bulk capacitor 27 is connected to the DC side of the rectifying unit 23 and the converter 24. The converter 24 may be a DC/DC converter or a DC/AC converter, and the present embodiment does not impose limitations on this.

The monitoring circuit 25 is connected to the AC side of the rectifying unit 23 and detects and judges whether an instantaneous absolute value of the AC voltage Vin is greater than a preset voltage. The preset voltage may be set as around 90V, for example. Rather, according to the actual application of the switching power supply, the preset voltage may be set as other values. The present embodiment does not impose limitations on this.

The control circuit 26 is connected to the monitoring circuit 25 and the Bulk capacitor 27, and performs controls such that the voltage across the Bulk capacitor maintains the peak value when the monitoring circuit 25 judges that the instantaneous absolute value of the input AC voltage Vin is greater than the preset voltage after the Bulk capacitor 27 having been charged by the rectifying unit 23 to a peak value of the AC voltage Vin, and performs controls such that the Bulk capacitor 27 discharges from the maintained peak value of the AC voltage so as to provide power to the converter 24 when the monitoring circuit 25 judges that the instantaneous absolute value of the input AC voltage Vin is smaller than or equal to the preset voltage.

Figure 3:
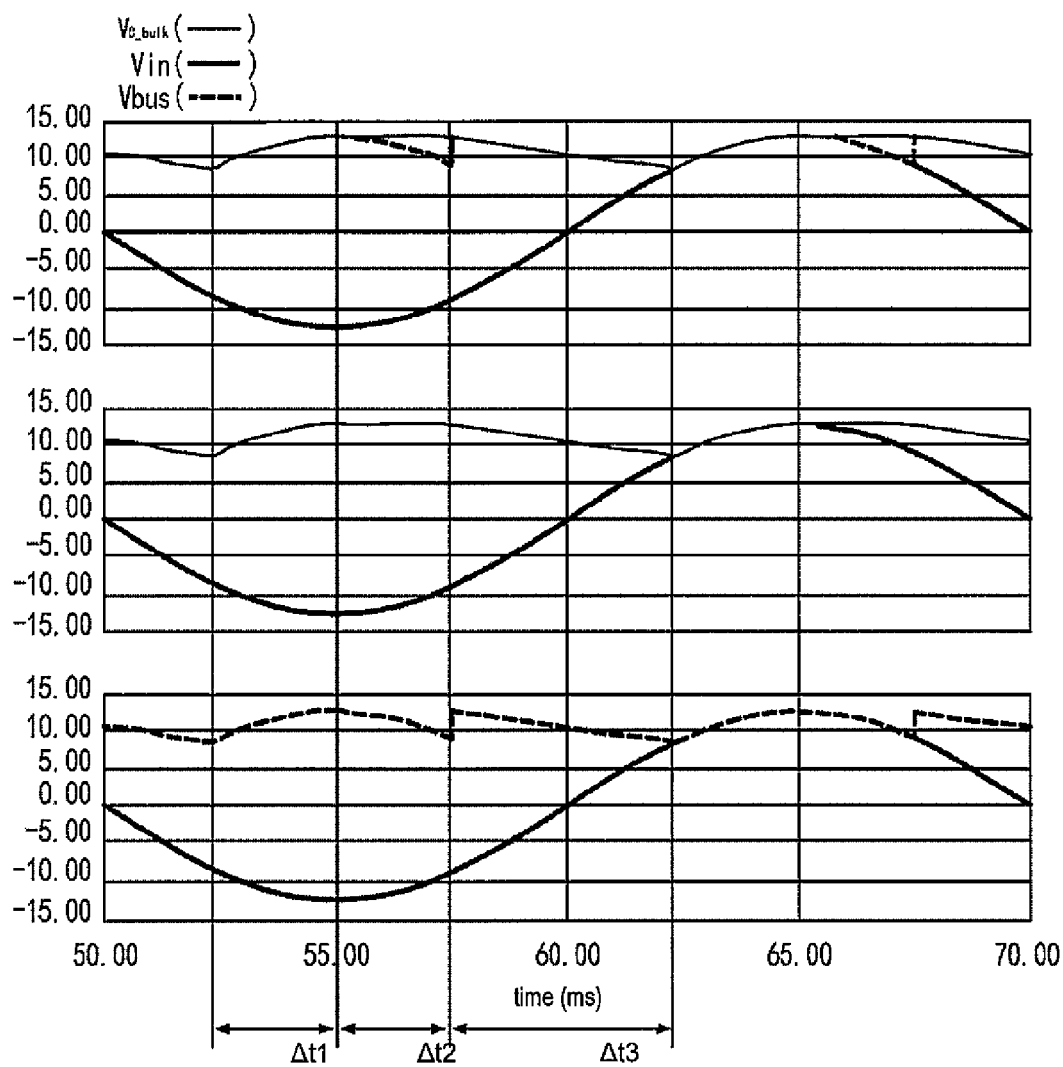
FIG. 3 shows relationships among an input AC voltage, a voltage across the Bulk capacitor and a voltage across the bus in the switching power supply shown in FIG. 2.

FIG. 3 shows relationships among an input AC voltage Vin, a voltage $V_{C\_bulk}$ across the Bulk capacitor and a voltage Vbus across the bus in the switching power supply shown in FIG. 2. In the present embodiment, the voltage $V_{C\_bulk}$ is a voltage across the Bulk capacitor 27, and the voltage Vbus across the bus is a voltage input to the converter 24. The principles of the switching power supply as shown in FIG. 2 will be explained hereinafter with reference to the waveforms shown in FIG. 3.

As shown in FIG. 3, during the time period of Δt1, i.e., the time period from the point when the monitoring circuit 25 judges that the instantaneous absolute value of the AC voltage is greater than the preset voltage to the point when the absolute value of the input AC voltage Vin rises to a peak value, the input AC voltage Vin charges the Bulk capacitor 27 to the peak value of the AC voltage, and the input AC voltage Vin provides power to the converter 24.

During the time period of Δt2, i.e., the time period during which the monitoring circuit 25 judges that the instantaneous absolute value of the AC voltage is greater than the preset voltage and the absolute value of the input AC voltage Vin falls down from the peak value to the preset voltage, the control circuit 26 performs controls such that the Bulk capacitor 27 does not provide power to the converter 24, the Bulk capacitor 27 maintains the peak voltage (see the flat part of the $V_{C\_bulk}$ waveform during Δt2 in FIG. 3), and the input voltage Vin provides power to the converter 24.

During the time period of Δt3, i.e., the time period during which the monitoring circuit 25 judges that the instantaneous absolute value of the AC voltage falls down to a value smaller than or equal to the preset voltage, the control circuit 26 performs controls such that the Bulk capacitor 27 provides power to the converter 24 from the peak value of the AC voltage.

Figure 4:
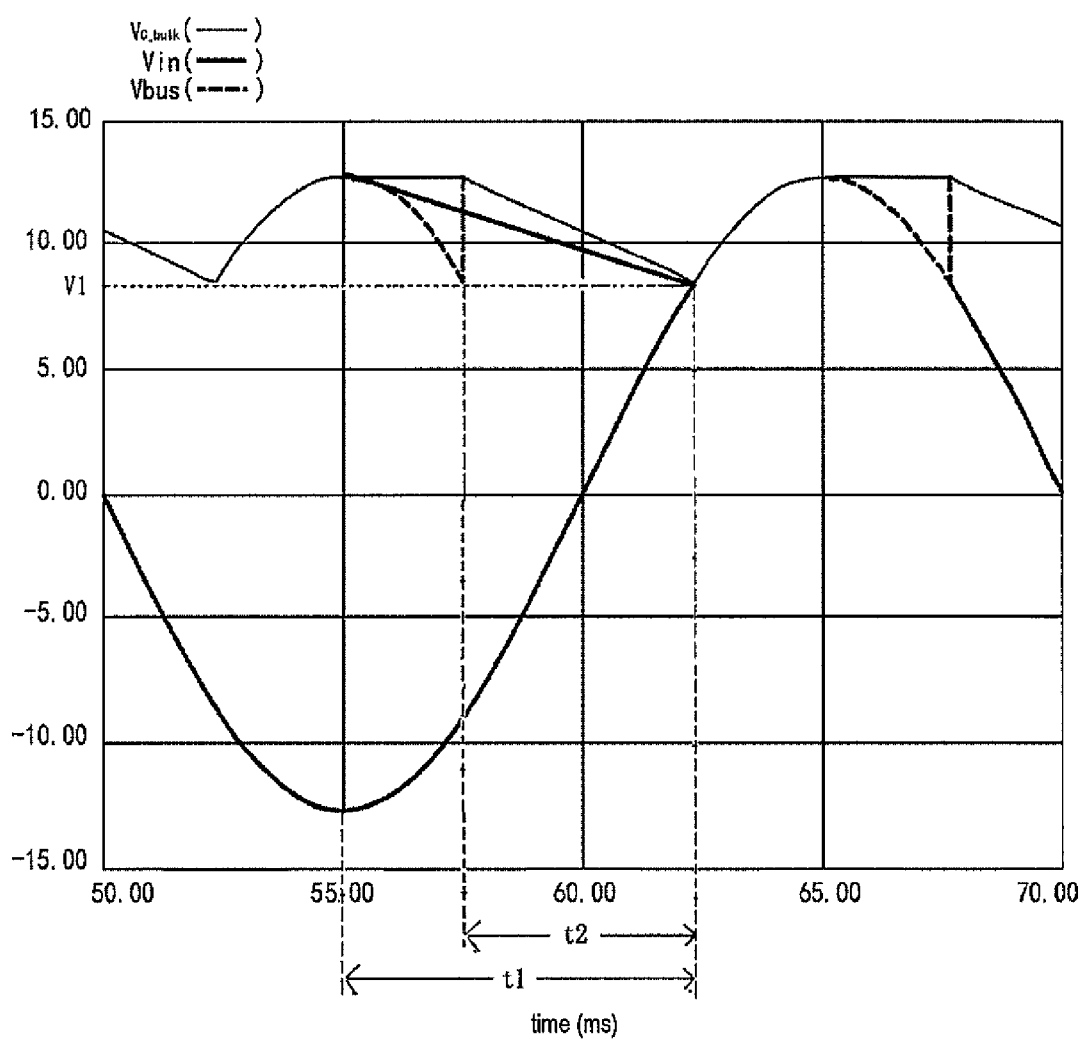
FIG. 4 illustratively shows waveforms of a switching power supply according to an embodiment.

Referring to the waveform shown in FIG. 4, under the condition where the same lowest Vbus will be guaranteed, if the switching power supply is the one shown in FIG. 1, i.e., no circuit for controlling the discharging timing of a Bulk capacitor is provided in the switching power supply, when the absolute value of the input AC voltage Vin starts to fall down from the peak value, the voltage $V_{C\_bulk}$ across the Bulk capacitor is greater than the AC voltage Vin, and thus the Bulk capacitor starts to discharge to provide power to the converter. It takes time period of t1 for the voltage $V_{C\_bulk}$ to fall down to a value when Vbus equals to V1, wherein V1 is the absolute value of Vin. On the contrary, in the present embodiment where the control circuit for controlling the discharging of the Bulk capacitor is added in the switching power supply, the Bulk capacitor is charged to the peak value of the AC voltage and maintains the peak voltage for a time of period (the time period obtained by subtracting t2 from t1 in FIG. 4), and then discharges from the peak value of the AC voltage. It takes time period of t2 for the voltage across the Bulk capacitor to fall down to a value when Vbus equals to V1, wherein t1 is greater than t2. According to principles of capacitors, since the time period for discharging is shortened, the requirement for the power storage capacity of the Bulk capacitor is reduced, and thereby the required capacitance of the capacitor is reduced. Consequently, the volume of the Bulk capacitor is reduced in the present disclosure.

To sum up, in the switching power supply provided by an embodiment of the present disclosure, a control circuit for controlling discharging of a Bulk capacitor is added, and thus the Bulk capacitor maintains a peak value for a time period and then provides power to a converter from the maintained peak value of an AC voltage, which shortens the discharge time of the Bulk capacitor. Thus, the capacitance and thereby the volume of the Bulk capacitor may be reduced. Consequently, it is conducive to realize miniaturization of the switching power supply.

In an embodiment of the present disclosure, the control circuit 26 may be disposed in a discharge loop formed by the Bulk capacitor 27 and the converter 24.

Specifically, under the situation where the monitoring circuit 25 judges that the instantaneous absolute value of the input AC voltage is greater than the preset voltage, the control circuit 26 may perform controls, i.e., controlling the discharge loop formed by the Bulk capacitor 27 and the converter 24 to be open; and under the situation where the monitoring circuit 25 judges that the instantaneous absolute value of the input AC voltage is smaller than or equal to the preset voltage, the control circuit 26 may performs controls, i.e., controlling the discharge loop formed by the Bulk capacitor 27 and the converter 24 to be closed.

Figure 5:
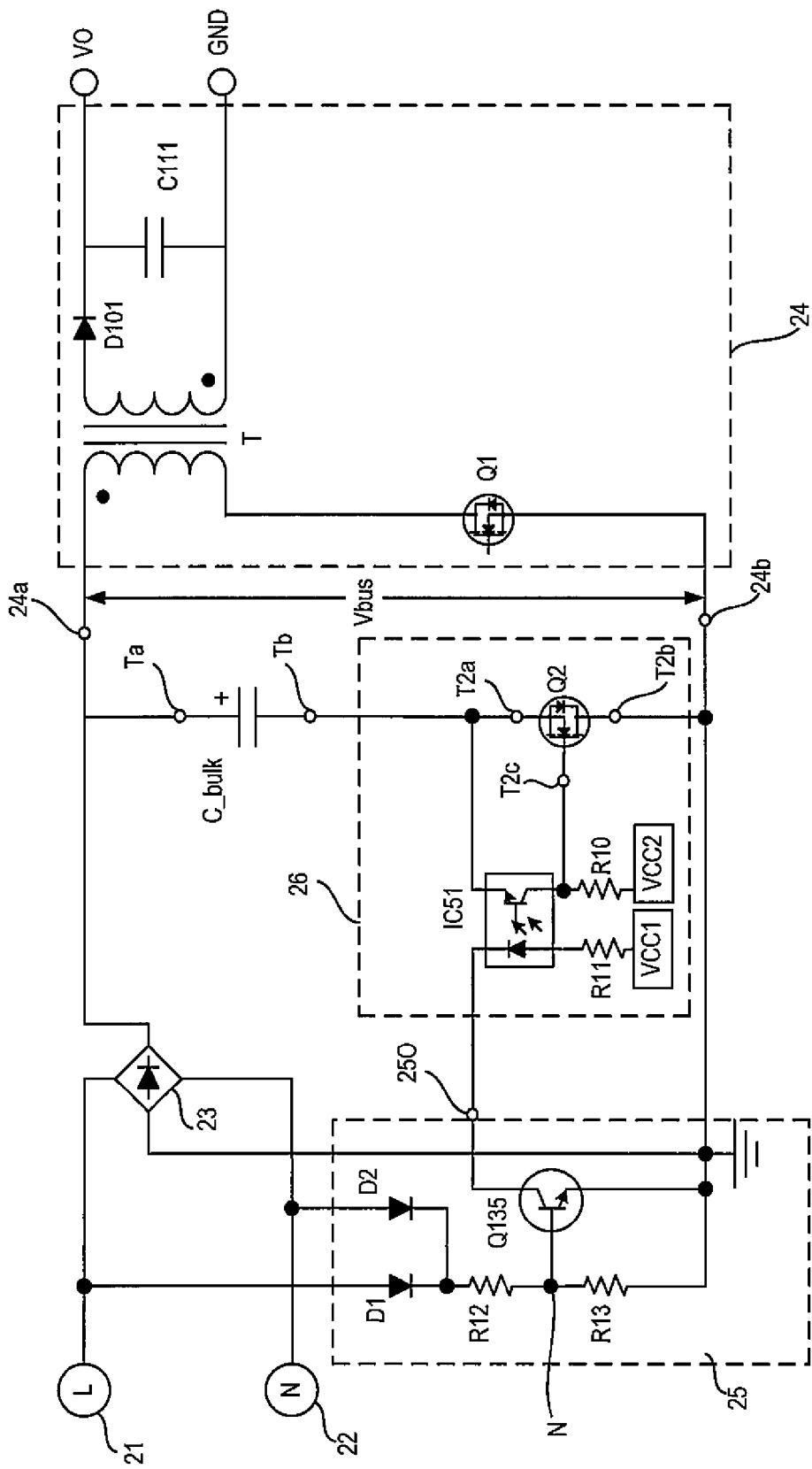
FIG. 5 illustratively shows a circuit diagram of a switching power supply according to an embodiment of the present disclosure.

FIG. 5 illustratively shows a circuit diagram of a switching power supply according to an embodiment of the present disclosure. In the present embodiment, the Bulk capacitor C_bulk includes a first terminal Ta and a second terminal Tb, the converter includes a first input terminal 24a and a second input terminal 24b, and the control circuit 26 is disposed between the second terminal Tb of the Bulk capacitor C_bulk and the second input terminal 24b of the converter 24.

The control circuit 26 includes a switching element Q2 which includes a control terminal T2c, a first terminal T2a and a second terminal T2b. The control terminal T2c is connected to a monitoring circuit 25. The switching element Q2 may be any type of semiconductor device which may be turned on or off according to a control signal input to a control terminal of the device, for example, the switching element Q2 may be a Metal Oxide Semiconductor Field Effect Transistor (MOSFET), a Junction Field Function Transistor (JFET), an Insulated Gate Bipolar Transistor (IGBT), a thyristor, a opto switch, or the like.

When the control terminal T2c is input with an on control signal from the monitoring circuit 25, the first terminal T2a and the second terminal T2b are connected with each other, such that the discharge loop formed by the Bulk capacitor C_bulk and the converter 24 is closed. When the control terminal T2c is input with an off control signal, the first terminal T2a and the second terminal T2b are disconnected with each other, such that the discharge loop formed by the Bulk capacitor C_bulk and the converter 24 is open.

The control circuit 26 further includes a first resistor R11, a second resistor R10 and an optocoupler IC51.

Respective first terminals of the first resistor R11 and the second resistor R10 may receive a first voltage (for example, VCC1) and a second voltage (for example, VCC2), respectively. VCC1 and VCC2 may be a low voltage.

The optocoupler IC51 is connected to an output terminal 25O of the monitoring circuit 25, a second terminal of the first resistor R11, a second terminal of the second resistor R10 and the control terminal T2c, and the first terminal T2a of the switching element Q2.

The monitoring circuit 25 may include a first diode D1, a second diode D2, a third resistor R12, a fourth resistor R13 and a transistor Q135. The transistor Q135 may be any type of switching device which may be turned on or off according to a control signal input to a control terminal of the device.

An anode of the first diode D1 is connected to a first AC voltage input terminal 21. An anode of the second diode D2 is connected to a second AC voltage input terminal 22. A first terminal of the third resistor R12 is connected to respective cathodes of the first diode D1 and the second diode D2. A first terminal of the fourth resistor R13 is connected to a second terminal of the third resistor R12. A first terminal of the transistor Q135 is connected to a junction of the second terminal of the third resistor R12 and the first terminal of the fourth resistor R13, a second terminal of the transistor Q135 is connected to the optocoupler IC51, and a third terminal of the transistor Q135 is connected to a second terminal of the fourth resistor R13. The second terminal of the transistor Q135 serves as the output terminal 25O of the monitoring circuit 25.

Operation principles of the switching power supply shown in FIG. 5 will be explained below as an example where the switching element Q2 is a MOSFET.

Two diodes D1 and D2 are used for detecting an instantaneous value of an input AC voltage. When the instantaneous absolute value of the input AC voltage is greater than a preset value, the transistor Q135 is turned on, the photocoupler IC51 is turned on, and thus the switching element Q2 is turned off because of an off control signal input to the control terminal of the switching element Q2. In this way, the discharge loop formed by the Bulk capacitor C_bulk and the converter 24 is open and thus the Bulk capacitor C_bulk cannot provide power to the converter 24. Also, during this time period, the Bulk capacitor C_bulk is charged by the output voltage from a rectifying unit 23 to a peak value of the input AC voltage Vin through the body diode of the switching element Q2 (i.e., the operation state during the said time period of Δt1).

When the instantaneous absolute value of the input AC voltage has reached the peak value and starts to fall down, the voltage Vbus across the bus is reduced. Because the discharge loop formed by the Bulk capacitor C_bulk and the converter 24 is open, the Bulk capacitor C_bulk cannot provide power to the converter 24. The voltage $V_{C\_bulk}$ across the Bulk capacitor C_bulk keeps unchanged. Consequently, the body diode of the switching element Q2 is reverse biased, and thus the voltage $V_{C\_bulk}$ across the Bulk capacitor C_bulk is kept at the peak value of the AC voltage Vin (i.e., the operation state during the said time period of Δt2).

When the instantaneous absolute value of the input AC voltage is smaller than or equal to the preset value, the transistor Q135 is turned off, the optocoupler IC51 is turned off, the second voltage VCC2 is input to the control terminal T2c of the switching element Q2, and thus the switching element Q2 is turned on because of the on control signal input to the control terminal of the switching element Q2, i.e., the first terminal T2a and the second terminal T2b are connected with each other. In this way, the discharge loop formed by the Bulk capacitor C_bulk and the converter 24 is closed and thus the Bulk capacitor C_bulk may provide power to the converter 24. Consequently, the Bulk capacitor C_bulk provides power to the converter 24 from the peak value of the AC voltage (i.e., the operation state during the said time period of Δt3).

According to an embodiment of the present disclosure, specific configurations of the monitoring circuit 25 and the control circuit 26 may be modified according to design requirements as long as the control circuit 26 may perform the following functions: controlling the discharge loop formed by the Bulk capacitor C_bulk and the converter 24 to be open when the monitoring circuit 25 judges that the instantaneous absolute value of the input AC voltage is greater than a preset voltage; and controlling the discharge loop formed by the Bulk capacitor C_bulk and the converter 24 to be closed when the monitoring circuit 25 judges that the instantaneous absolute value of the input AC voltage is smaller than or equal to a preset voltage. For example, the configurations of the monitoring circuit 25 and the control circuit 26 may be judged according to the type of the switching element Q2. For example, if the switching element Q2 is an N-type field effect transistor, when the instantaneous absolute value of the input AC voltage is greater than a preset value, the transistor Q135 is turned on, the optocoupler IC51 is turned on, and thus the switching element Q2 is turned off, and when the instantaneous absolute value of the input AC voltage is smaller than or equal to the preset value, the transistor Q135 is turned off, the optocoupler IC51 is turned off, and thus the switching element Q2 is turned on. If the switching element Q2 is a P-type field effect transistor, the monitoring circuit 25 and the control circuit 26 may be properly designed, so that when the instantaneous absolute value of the input AC voltage is greater than a preset value, the transistor Q135 is turned off, the optocoupler IC51 is turned off, and thus the switching element Q2 is turned off, and when the instantaneous absolute value of the input AC voltage is smaller than or equal to the preset value, the transistor Q135 is turned on, the optocoupler IC51 is turned on, and thus the switching element Q2 is turned on. According to another embodiment of the present disclosure, the control circuit 26 may include an opto switch. When the monitoring circuit 25 judges that the instantaneous absolute value of the input AC voltage is greater than a preset voltage, the opto switch is turned off, and thus the discharge loop formed by the Bulk capacitor C_bulk and the converter 24 is open. When the monitoring circuit 25 judges that the instantaneous absolute value of the input AC voltage is smaller than or equal to the preset voltage, the opto switch is turned on, and thus the discharge loop formed by the Bulk capacitor C_bulk and the converter 24 is closed.

According to another embodiment of the present disclosure, the switching element Q2 may be connected in parallel with a diode. The connections of an anode and a cathode of the parallel diode may be the same as the body diode of the switching element Q2 as shown in FIG. 5, i.e., the anode of the parallel diode is connected to the terminal T2a, and the cathode of the parallel diode is connected to the terminal T2b.

According to an embodiment of the present disclosure, the converter 24 may be a DC/DC converter formed by a capacitor C111, a diode D101, a transformer T and a switching element Q1 as shown in FIG. 5, i.e., a converter having a flyback topology. Rather, the converter may be a DC/AC converter. Thus, the switching power supply provided by embodiments of the present disclosure may be an AC/DC power supply or an AC/AC power supply. The converter 24 may be an isolated converter or a non-isolated converter.

Figure 6:
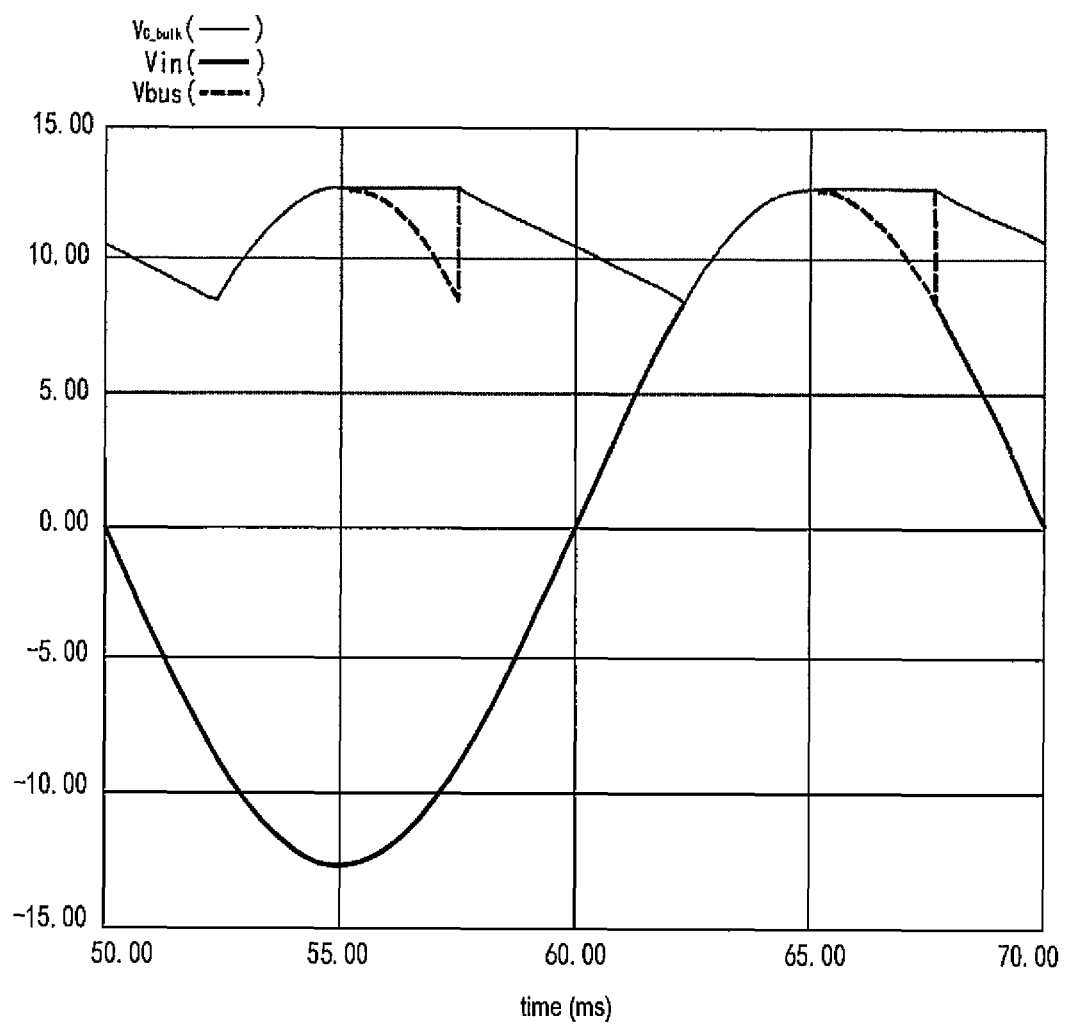
FIG. 6 illustratively shows waveforms of the switching power supply shown in FIG. 5.

FIG. 6 illustratively shows waveforms of the switching power supply shown in FIG. 5. It can be seen from this figure that the voltage $V_{C\_bulk}$ across the Bulk capacitor remains at the peak value for a time period and then discharges to the converter from the peak value.

In the switching power supply as shown in FIG. 5, the control circuit 26 formed by the optocoupler IC51, the resistor R11, the resistor R10 and the switching element Q2 is added, and thus after the Bulk capacitor having been charged to a peak value of the input AC voltage Vin, when the instantaneous absolute value of the input AC voltage is greater than a preset value, controls are performed such that the Bulk capacitor does not provide power to the converter, and the voltage across the Bulk capacitor maintains the peak value of the AC voltage; and when the instantaneous absolute value of the input AC voltage is smaller than or equals to the preset value, the Bulk capacitor starts to provide power to the converter 24 from the peak value of the AC voltage, the voltage $V_{C\_bulk}$ across the Bulk capacitor starts to fall down from the peak value of the AC voltage. Thus, the discharging time of the Bulk capacitor is shortened compared with the discharging time that the voltage $V_{C\_bulk}$ across the Bulk capacitor starts to provide power to the converter 24 after $V_{C\_bulk}$ reaching the peak value of the AC voltage immediately, and thus the capacitance and thereby the volume of the Bulk capacitor may be reduced. Consequently, it is conducive to realize miniaturization of the switching power supply.

Figure 7:
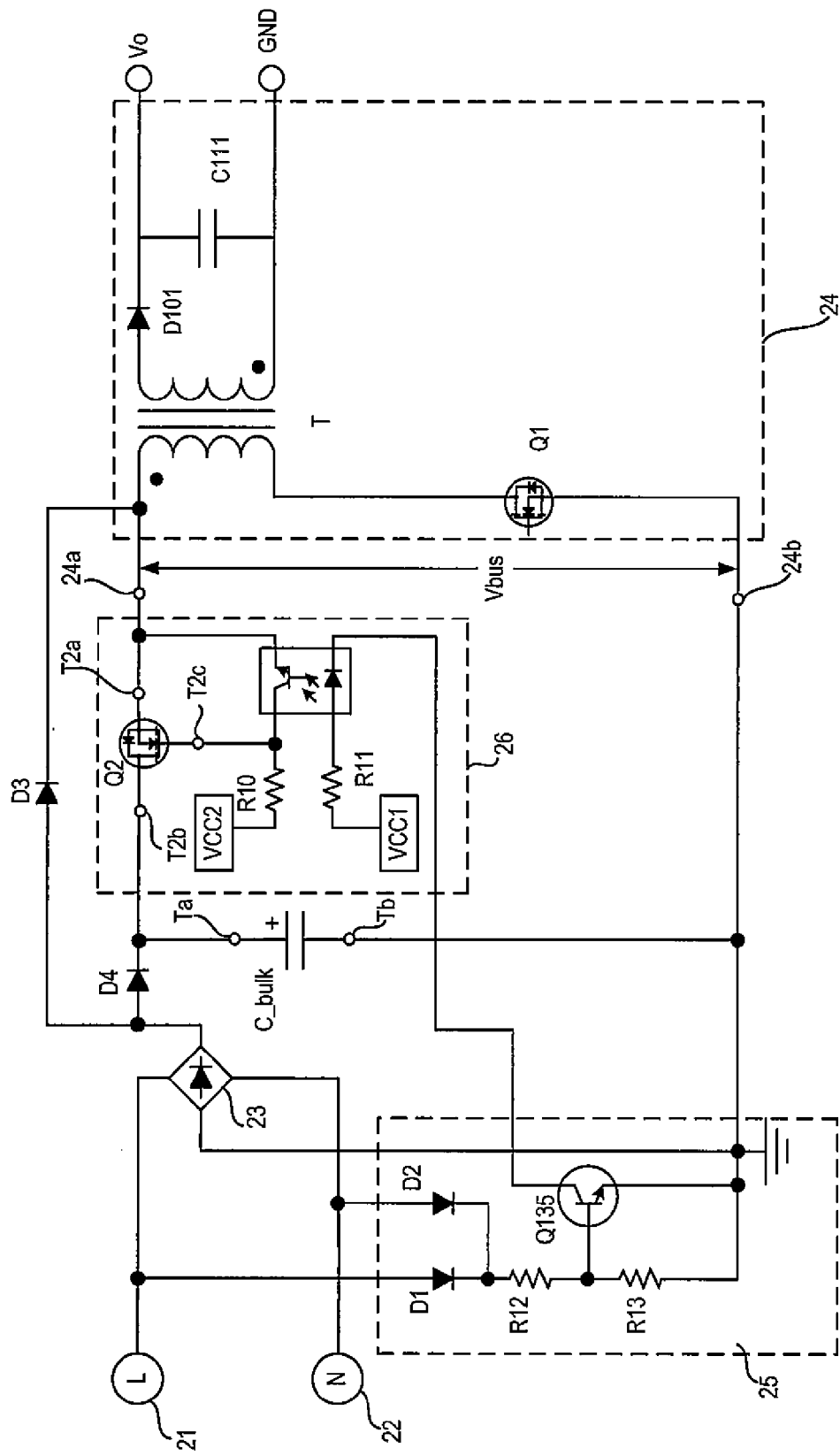
FIG. 7 illustratively shows a circuit diagram of a switching power supply according to another embodiment of the present disclosure.

FIG. 7 illustratively shows a circuit diagram of a switching power supply according to another embodiment of the present disclosure. The control circuit 26 and the monitoring circuit 25 in this embodiment have the similar configurations as those shown in FIG. 5 except for the flowing differences: the control circuit 26 is disposed between the first terminal Ta of the Bulk capacitor C_bulk and the first terminal 24a of the converter 24 in the embodiment as shown in FIG. 7; and a third diode D3 and a fourth diode D4 are further added in the embodiment as shown in FIG. 7.

An anode of the third diode D3 is connected to the DC side of the rectifying unit 23, and a cathode of the third diode D3 is connected to the converter 24 and the first terminal T2a of the switching element Q2. An anode of the fourth diode D4 is connected to the DC side of the rectifying unit 23, and a cathode of the fourth diode D4 is connected to the first terminal Ta of the Bulk capacitor C_bulk and the second terminal T2b of the switching element Q2.

When the switching element Q2 is turned off, the rectifying unit 23 charges the Bulk capacitor C_bulk via the diode D4. The third diode D3 plays a function of allowing the rectifying unit 23 to provide power to the converter 24 via the third diode D3 when the switching element Q2 is turned off.

Figure 8:
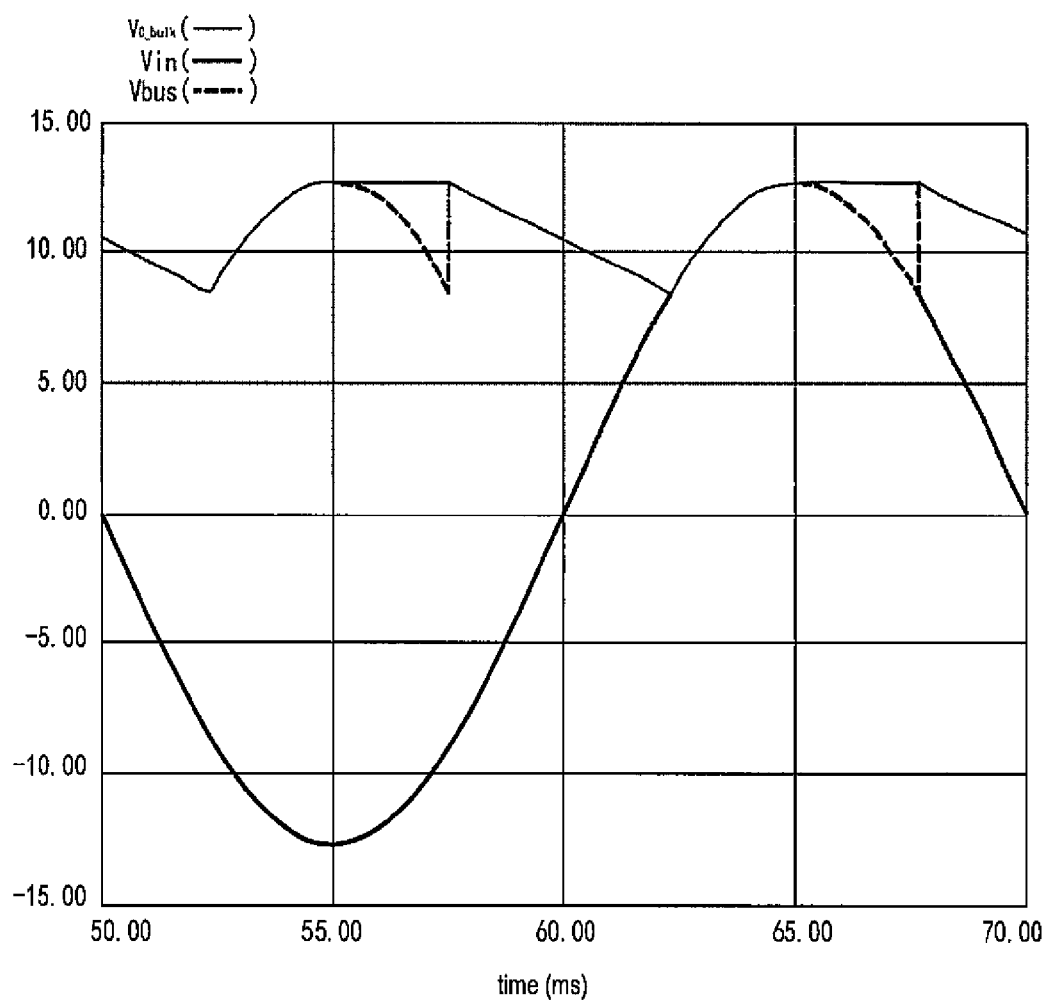
FIG. 8 illustratively shows waveforms of the switching power supply shown in FIG. 7.

FIG. 8 illustratively shows waveforms of the switching power supply as shown in FIG. 7. It can be seen from this figure that the voltage $V_{C\_bulk}$ across the Bulk capacitor remains at the peak value voltage for a time period and then falls down from the peak value voltage, and thus the discharging time of the Bulk capacitor may be shortened.

By employing the switching power supply as shown in FIG. 7, the power storage capacity of the Bulk capacitor is fully utilized, and thus the volume of the Bulk capacitor and thereby the volume of the switching power supply may be reduced.

Figure 9:
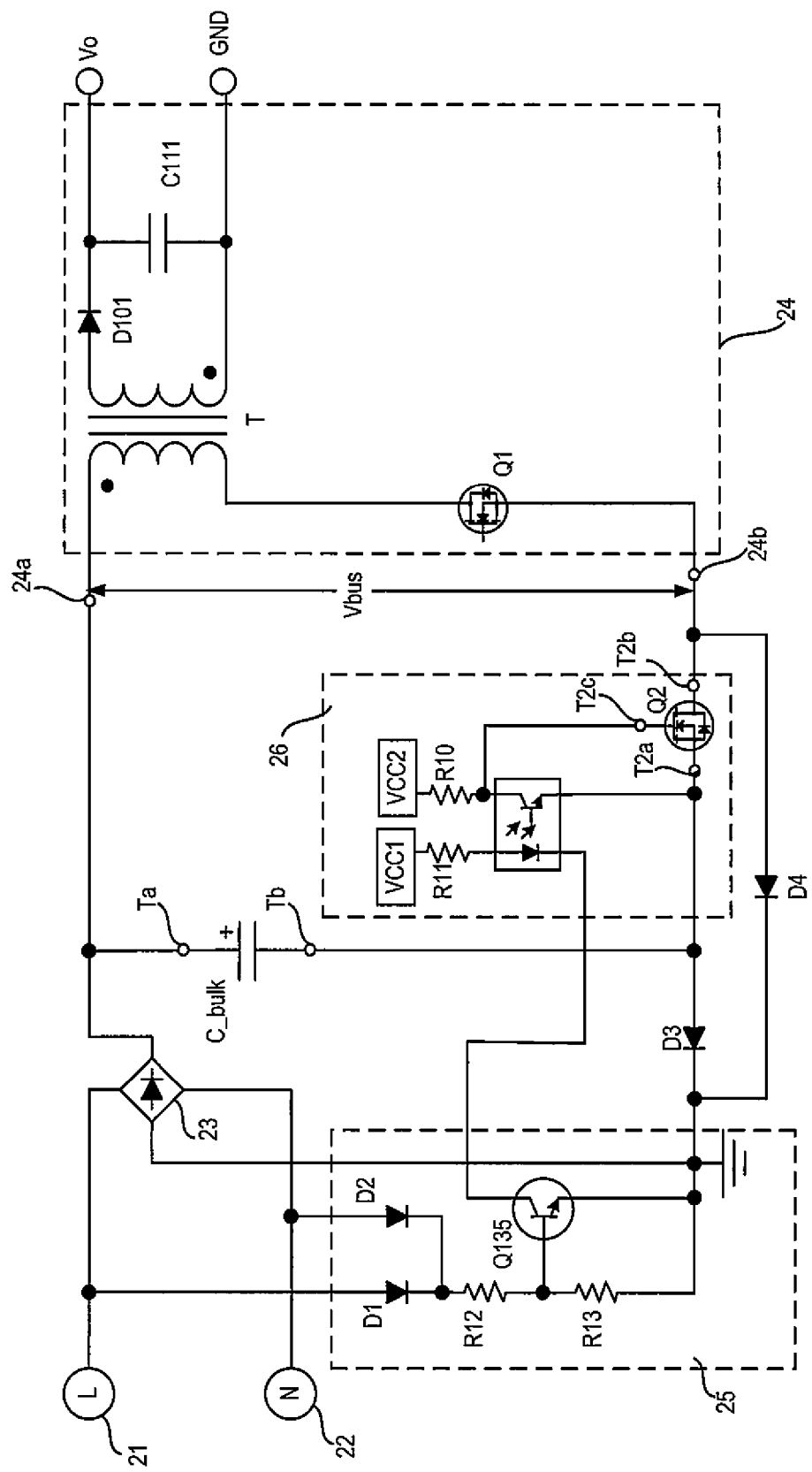
FIG. 9 illustratively shows a circuit diagram of a switching power supply according to another embodiment of the present disclosure.

FIG. 9 illustratively shows a circuit diagram of a switching power supply according to another embodiment of the present disclosure. The control circuit 26 and the monitoring circuit 25 in this embodiment have the similar configurations as those shown in FIG. 5 except for the flowing differences: the control circuit 26 is disposed between the second terminal Tb of the Bulk capacitor C_bulk and the second terminal 24b of the converter 24 in the embodiment as shown in FIG. 9; and a third diode D3 and a fourth diode D4 are further added in the embodiment as shown in FIG. 9.

An anode of the third diode D3 is connected to the first terminal T2a of the switching element Q2 and the second terminal Tb of the Bulk capacitor C_buok, and a cathode of the third diode D3 is connected to the DC side of the rectifying unit 23. An anode of the fourth diode D4 is connected to the second terminal 24b of the converter 24 and the second terminal T2b of the switching element Q2, and a cathode of the fourth diode D4 is connected to the DC side of the rectifying unit 23.

When the switching element Q2 is turned off, the rectifying unit 23 charges the Bulk capacitor C_bulk via the third diode D3. The fourth diode D4 plays a function of allowing the rectifying unit 23 to provide power to the converter 24 via the fourth diode D4 when the switching element Q2 is turned off.

By employing the switching power supply as shown in FIG. 9, the discharging time of the Bulk capacitor may also be shortened so as to reduce the volume of the Bulk capacitor and thereby the volume of the switching power supply.

According to an embodiment of the present disclosure, the switching power supply may have a topology without a power factor correction (PFC) circuit, i.e., there is no PFC circuit in the switching power supply.

In a switching circuit without a PFC circuit, a Bulk capacitor with relatively high capacitance is usually needed to guarantee relatively small ripples in output voltage of the switching power supply. Under such condition, the increased volume of the Bulk capacitor due to its relatively high capacitance and thereby the increased volume of the switching power supply becomes an outstanding problem. In such switching power supply, the technical solution provided by the present disclosure may be employed, i.e., a control circuit for controlling discharging of a Bulk capacitor is added, such that the capacitance of the Bulk capacitor is reduced as much as possible, while relatively small ripples in output voltage of the switching power supply are guaranteed.

The present disclosure further provides a method for controlling a voltage of a Bulk capacitor in a switching power supply. The switching power supply includes the above-mentioned rectifying unit, the Bulk capacitor and the converter. The rectifying unit converts an input AC voltage into a DC voltage, and the Bulk capacitor is disposed between the rectifying unit and the converter. The method includes:

detecting an instantaneous absolute value of the AC voltage;

comparing the detected instantaneous absolute value of the AC voltage with a preset voltage; and controlling the Bulk capacitor in a discharging or charging state according to comparison result.

According to an embodiment, after the Bulk capacitor having been charged by the rectifying unit to a peak value of the AC voltage, when the instantaneous absolute value of the AC voltage is greater than the preset voltage, controls are performed such that Bulk capacitor the voltage across the Bulk capacitor maintains the peak value of the AC voltage; and when the instantaneous absolute value of the AC voltage is smaller than or equal to the preset voltage, the Bulk capacitor discharges from the maintained peak value of the AC voltage so as to provide power to the converter.

According to an embodiment, the switching power supply may further include a control circuit for controlling discharging of the Bulk capacitor which is disposed in a discharge loop formed by the Bulk capacitor and the converter. When the instantaneous absolute value of the AC voltage is greater than the preset voltage, the control circuit controls the discharge loop formed by the Bulk capacitor and the converter to be open. When the instantaneous absolute value of the AC voltage is smaller than or equal to the preset voltage, the control circuit controls the discharge loop formed by the Bulk capacitor and the converter to be closed.

According to an embodiment, the control circuit includes a switching element, and opening and closing of the discharging loop formed by the Bulk capacitor and the converter is correspondingly controlled by on and off of the switching element. According to an embodiment, the switching element is further connected in parallel with a diode.

With respect to detailed principles of the control method, the previous description of the switching power supply with reference to the drawings may be referred to.

The technical effects which may be obtained by the control method correspond to those of the switching power supply, and detailed descriptions thereof are therefore omitted.

Although the present application has been described with reference to several typical embodiments, it should be understood that the terminologies used herein are for illustration purposes rather than to limit the present application. The present application can be implemented in many specific forms without departing from the spirit and scope of the present application, and thus it would be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A switching power supply, comprising:
   a rectifying unit having an Alternating Current (AC) side and a Direct Current (DC) side, the rectifying unit being configured to convert an AC voltage which is input to the AC side into a DC voltage which is output from the DC side;
   a Bulk capacitor connected to the DC side of the rectifying unit;
   a converter connected to the Bulk capacitor;
   a monitoring circuit connected to the AC side of the rectifying unit, the monitoring circuit being configured to detect and judge whether an instantaneous absolute value of the AC voltage is greater than a preset voltage; and
   a control circuit controlling discharging of the Bulk capacitor, connected to the monitoring circuit and the Bulk capacitor, the control circuit being configured to perform controls such that the Bulk capacitor maintains the peak value when the monitoring circuit judges that the instantaneous absolute value of the input AC voltage is greater than the preset voltage after the Bulk capacitor having been charged by the rectifying unit to a peak value of the AC voltage, and to perform controls such that the Bulk capacitor discharges from the maintaining peak value of the AC voltage so as to provide power to the converter when the monitoring circuit judges that the instantaneous absolute value of the input AC voltage is smaller than or equal to the preset voltage,
   wherein the control circuit is disposed in a discharge loop formed by the Bulk capacitor and the converter, and wherein the Bulk capacitor comprises a first terminal and a second terminal which are connected to two input terminals of the converter, respectively.

2. The switching power supply according to claim 1, wherein when the instantaneous absolute value of the input AC voltage is greater than the preset voltage, the control circuit controls the discharge loop formed by the Bulk capacitor and the converter to be open; and when the instantaneous absolute value of the input AC voltage is smaller than or equal to the preset voltage, the control circuit controls the discharge loop formed by the Bulk capacitor and the converter to be closed.

3. The switching power supply according to claim 1, wherein the control circuit comprises a switching element which has a control terminal connected to the monitoring circuit, a first terminal and a second terminal,
   when the control terminal receives an on control signal from the monitoring circuit, the first terminal and the second terminal of the switching element are connected with each other, such that the discharge loop formed by the Bulk capacitor and the converter is closed, and
   when the control terminal receives an off control signal from the monitoring circuit, the first terminal and the second terminal of the switching element are disconnected with each other, such that the discharge loop formed by the Bulk capacitor and the converter is open.

4. The switching power supply according to claim 3, wherein the switching element is further connected in parallel with a diode.

5. The switching power supply according to claim 3, wherein
   the switching element is disposed between the first terminal of the Bulk capacitor and one of the two input terminals of the converter, or
   the switching element is disposed between the second terminal of the Bulk capacitor and the other one of the two input terminals of the converter.

6. The switching power supply according to claim 5, wherein the control circuit further comprises:
   a first resistor and a second resistor each having a first terminal for receiving a first voltage and a second voltage, respectively; and
   an optocoupler connected to an output terminal of the monitoring circuit, a second terminal of the first resistor, a second terminal of the second resistor and the control terminal, and the first terminal of the switching element.

7. The switching power supply according to claim 6, wherein the monitoring circuit comprises:
- a first diode having an anode connected to a first AC voltage input terminal at the AC side of the rectifying unit;
- a second diode having an anode connected to a second AC voltage input terminal at the AC side of the rectifying unit;
- a third resistor having a first terminal connected to respective cathodes of the first diode and the second diode;
- a fourth resistor having a first terminal connected to a second terminal of the third resistor; and
- a transistor having:
  - a first terminal connected to a junction of the second terminal of the third resistor and the first terminal of the fourth resistor;
  - a second terminal connected to the optocoupler; and
  - a third terminal connected to a second terminal of the fourth resistor, wherein the second terminal of the transistor serves as the output terminal of the monitoring circuit.

8. The switching power supply according to claim 5, further comprising:
- a third diode having an anode connected to the DC side of the rectifying unit and a cathode connected to the converter and the first terminal of the switching element; and
- a fourth diode having an anode connected to the DC side of the rectifying unit and a cathode connected to the second terminal of the switching element and the first terminal of the Bulk capacitor.

9. The switching power supply according to claim 5, further comprising:
- a third diode having an anode connected to the first terminal of the switching element and the second terminal of the Bulk capacitor and a cathode connected to the DC side of the rectifying unit; and
- a fourth diode having an anode connected to the converter and the second terminal of the switching element and a cathode connected to the DC side of the rectifying unit.

10. The switching power supply according to claim 1, wherein the switching power supply has a topology without a power factor correction circuit.

11. The switching power supply according to of claim 1, wherein the topology of said converter is a flyback topology.

12. A method for controlling a voltage of a Bulk capacitor in a switching power supply, wherein the switching power supply comprises a rectifying unit, a Bulk capacitor and a converter, the rectifying unit converts an input Alternating Current (AC) voltage into a Direct Current (DC) voltage, and the Bulk capacitor is disposed between the rectifying unit and the converter, wherein the method comprises:
- detecting an instantaneous absolute value of the AC voltage;
- comparing the detected instantaneous absolute value of the AC voltage with a preset voltage; and
- controlling discharging and charging state of the Bulk capacitor according to comparison results, wherein the switching power supply further comprises a control circuit for controlling discharging of the Bulk capacitor which is disposed in a discharge loop formed by the Bulk capacitor and the converter, and wherein the Bulk capacitor comprises a first terminal and a second terminal which are connected to two input terminals of the converter, respectively.

13. The method according to claim 12, wherein when the instantaneous absolute value of the AC voltage is greater than the preset voltage, controls are performed such that the voltage across the Bulk capacitor maintains the peak value of the AC voltage after the Bulk capacitor having been charged by the rectifying unit to a peak value of the AC voltage, and when the instantaneous absolute value of the AC voltage is smaller than or equal to the preset voltage, the Bulk capacitor discharges from the peak value of the AC voltage so as to provide power to the converter.

14. The method according to claim 13, wherein:
- when the instantaneous absolute value of the AC voltage is greater than the preset voltage, the control circuit controls the discharge loop formed by the Bulk capacitor and the converter to be open, and
- when the instantaneous absolute value of the AC voltage is smaller than or equal to the preset voltage, the control circuit controls the discharge loop formed by the Bulk capacitor and the converter to be closed.

15. The method according to claim 14, wherein the control circuit comprises a switching element, and opening and closing of the discharging loop formed by the Bulk capacitor and the converter is correspondingly controlled by on and off of the switching element.

16. The method according to claim 15, wherein the switching element is further connected in parallel with a diode.

* * * * *